(12) United States Patent
Lee

(10) Patent No.: US 7,617,044 B2
(45) Date of Patent: Nov. 10, 2009

(54) APPARATUS AND METHOD FOR DISPLAYING ROUTE IN PERSONAL NAVIGATION TERMINAL

(75) Inventor: Jae-Myeon Lee, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 476 days.

(21) Appl. No.: 11/312,144

(22) Filed: Dec. 20, 2005

(65) Prior Publication Data
US 2006/0178822 A1 Aug. 10, 2006

(30) Foreign Application Priority Data
Dec. 29, 2004 (KR) .................. 10-2004-0115411

(51) Int. Cl.
*G01C 21/34* (2006.01)
(52) U.S. Cl. .................. 701/209; 701/208; 701/25
(58) Field of Classification Search ......... 701/200–202, 701/208–209, 213–215, 23, 25; 340/988, 340/995.1; 342/357.06, 357.12
See application file for complete search history.

(56) References Cited
U.S. PATENT DOCUMENTS
6,208,934 B1 * 3/2001 Bechtolsheim et al. ...... 701/209
7,136,744 B2 * 11/2006 Maeda ........................ 701/200

FOREIGN PATENT DOCUMENTS
KR 2003-0009309 1/2003

* cited by examiner

*Primary Examiner*—Yonel Beaulieu
(74) *Attorney, Agent, or Firm*—The Farrell Law Firm, LLP

(57) ABSTRACT

Disclosed is a route guidance apparatus of a personal navigation terminal, which includes a road structure information storage unit for storing information related to road structures, a user preference information storage unit for storing at least one road structure preference representing a preference of a user for the road structures, and a controller for determining a current location of the personal navigation terminal, computing routes to a destination from the current location, and selecting a user-preferred route preferred by a user from among the routes based on the at least one road structure preference. In the route guidance apparatus, a personal navigation terminal displays routes based on user preferences reflecting user characteristics instead of simply displaying the shortest route, thereby causing a user to take a proper route according to one's own characteristics and degree of fatigue.

23 Claims, 10 Drawing Sheets

| ROAD STRUCTURE | LENGTH (m) | SLOPE (1~5) | HEIGHT COEFFICIENT (1~5) | DEPTH COEFFICIENT (1~5) |
|---|---|---|---|---|
| CROSSWALK | 10 | 1 | 1 | 1 |
| UPHILL ROAD | 30 | 3 | 1 | 1 |
| DOWNHILL ROAD | 25 | 4 | 1 | 1 |
| VIADUCT | 20 | 1 | 2 | 1 |
| UNDERPASS | 50 | 1 | 1 | 2 |
| RAILWAY CROSSING | 5 | 1 | 1 | 1 |
| TUNNEL | 40 | 1 | 1 | 1 |
| CONSTRUCTION ZONE | 10 | 1 | 1 | 1 |
| ALLEY WITH NO SIDEWALK | 25 | 1 | 1 | 1 |
| ⋮ | ⋮ | ⋮ | ⋮ | ⋮ |

FIG.2

| USER | ROAD STRUCTURE PREFERENCE (0~10) | | PUBLIC TRANSPORT PREFERENCE | |
|---|---|---|---|---|
| A (GENERAL PUBLIC) | CROSSWALK | 2 | BUS | 5 |
| | UPHILL ROAD | 1 | | |
| | DOWNHILL ROAD | 10 | SUBWAY | 3 |
| | VIADUCT | 2 | | |
| | UNDERPASS | 8 | TAXI | 1 |
| | RAILWAY CROSSING | 5 | | |
| | TUNNEL | 2 | ⋮ | ⋮ |
| | CONSTRUCTION ZONE | 0 | | |
| | ALLEY WITH NO SIDEWALK | 4 | | |
| | ⋮ | ⋮ | | |
| B (DISABLED) | CROSSWALK | 4 | BUS | 1 |
| | UPHILL ROAD | 2 | | |
| | ⋮ | ⋮ | ⋮ | ⋮ |

FIG.3

APPARATUS AND METHOD FOR DISPLAYING ROUTE IN PERSONAL NAVIGATION TERMINAL

PRIORITY

This application claims priority to an application entitled "Apparatus and Method for Displaying Route in Personal Navigation Terminal" filed in the Korean Intellectual Property Office on Dec. 29, 2004 and assigned Serial No. 2004-115411, the contents of which are hereby incorporated by reference.

BACKGROUND OF THE INVENTION

1. Field of the Invention

The present invention relates to a personal navigation terminal, and more particularly to an apparatus and a method for route guidance, which display routes by taking into consideration user preference for road structures, means of public transport, etc., in a personal navigation terminal.

2. Description of the Related Art

A Personal Navigation System (PNS) provides a location based service to Personal Digital Assistant (PDAs) or cell phones. Current location based service has been developed for a Car Navigation System (CNS) associated with vehicles. A PNS was developed by applying the location based service to a portable terminal for personal use.

Typically, a terminal for supporting a PNS is called a personal navigation terminal. A personal navigation terminal may be used inside a car while traveling as well as on a narrow sidewalk other than a roadway, alley, etc. A personal navigation terminal may also display a current location on a map. A personal navigation terminal may also display a map of an area around the current location, simultaneously shows the shortest distance route to a desired destination, etc., thereby providing users with various location information.

Such a PNS is similar to a CNS only in terms of displaying routes to a user. However, the CNS displays routes only for a roadway while the PNS displays routes along which a person can walk. Accordingly, the PNS needs a route guidance scheme different from that of the CNS. For example, when a driver travels to a destination, the CNS allows the driver to select a favorite road from an express highway, a national highway, etc., or select preference for a toll road. Further, the CNS uses a scheme for computing a route to the destination after reviewing the preference. However, in the PNS, the user preference must be differently reviewed.

For example, in the CNS, because the individual does not directly walk along an uphill road or a downhill road but moves along the uphill road or the downhill road by car, it is not necessary to consider the user's characteristics, fatigue, etc. However, in the PNS, because the individual is actually walking, it is necessary to consider the user's characteristics, fatigue, etc. When the individual continues to pass through underpasses or overpass viaducts in a city having many underpasses or viaducts, the individual may become very tired. Further, when the individual passes through a building construction zone, etc., the individual may suffer from strong noise and may be in danger.

However, the personal navigation terminal according to the prior art displays only the shortest route without taking into consideration the user's preferences based on users' characteristics, fatigue, etc. That is, the personal navigation terminal according to the prior art displays the shortest route including an uphill road even though a user cannot go up the uphill road. Further, when a user is disabled and cannot use a viaduct, an underpass interval or an uphill interval, the PNS according to the prior art displays only the shortest route without considering the user's characteristics.

In the PNS according to the prior art as described above, a user must receive the shortest route even if the shortest route is a road which the user does not want, a difficult road to walk or a road along which the user cannot pass through due to obstacles.

SUMMARY OF THE INVENTION

Accordingly, the present invention has been made to solve at least the above-mentioned problems occurring in the prior art, and it is an object of the present invention to provide an apparatus and a method for route guidance, which display routes based on user characteristics or preferences in a personal navigation terminal.

It is another object of the present invention to provide an apparatus and a method for route guidance, which store user preferences for road structures, means of public transport, etc., based on user characteristics or preferences, and display routes based on the stored user preferences, in a personal navigation terminal.

In order to accomplish the aforementioned object, according to one aspect of the present, there is provided a route guidance apparatus of a personal navigation terminal, the route guidance apparatus including a road structure information storage unit for storing information regarding road structures; a user preference information storage unit for storing at least one road structure preference representing at least one preference of a user for the road structures; and a controller for determining a current location of the personal navigation terminal, computing routes to a destination from the current location, and selecting a user-preferred route preferred by a user from among the routes to the destination from the current location by means of the at least one road structure preference.

In order to accomplish the aforementioned object, according to another aspect of the present, there is provided a route guidance method of a personal navigation terminal, the route guidance method including storing at east one road structure preferences representing preferences of a user for road structures; determining a current location of the personal navigation terminal; computing routes to the destination from the current location; and selecting a user-preferred route from among the routes based on the at least one road structure preference.

In order to accomplish the aforementioned object, according to further another aspect of the present, there is provided a route guidance method of a personal navigation terminal, the route guidance method including storing at least one user preference for road structures and public transportation; determining a current location of the personal navigation terminal; when a determination request regarding whether to use public transportation after route computation is received from the user, setting whether to use the public transportation to be determined after the route computation; computing routes using the public transport and routes excluding the public transportation to the destination from the current location; selecting a user-preferred route preferred by the user from among the computed routes based on the at least one road structure preference; displaying the user-preferred route and receiving from the user a selection regarding whether to use the public transportation in order to determine whether to use public transportation after the route computation; and displaying the user-preferred route preferred by the user according to the selection regarding whether to use the public transportation.

In order to accomplish the aforementioned object, according to still another aspect of the present, there is provided a route guidance method of a personal navigation terminal, the route guidance method including storing at least one user preference for road structures and public transportation; determining a current location of the personal navigation terminal; computing and displaying a shortest route to a destination from the current location; determining if road structures exist while displaying the shortest route; if the road structures exist while displaying the shortest route, computing a user-preferred route preferred by a user based on at least one user preference for the road structures; and displaying the computed user-preferred route.

BRIEF DESCRIPTION OF THE DRAWINGS

The above and other objects, features and advantages of the present invention will be more apparent from the following detailed description taken in conjunction with the accompanying drawings, in which:

FIG. 2 is a table illustrating one example of storing road structure information according to an embodiment of the present invention;

FIG. 3 is a table illustrating one example of storing user preference information according to an embodiment of the present invention;

DETAILED DESCRIPTION OF THE PREFERRED EMBODIMENT

Preferred embodiments of the present invention will be described in detail herein below with reference to the accompanying drawings. In the following description, a detailed description of known functions and configurations incorporated herein will be omitted when it may obscure the subject matter of the present invention.

Figure 1:
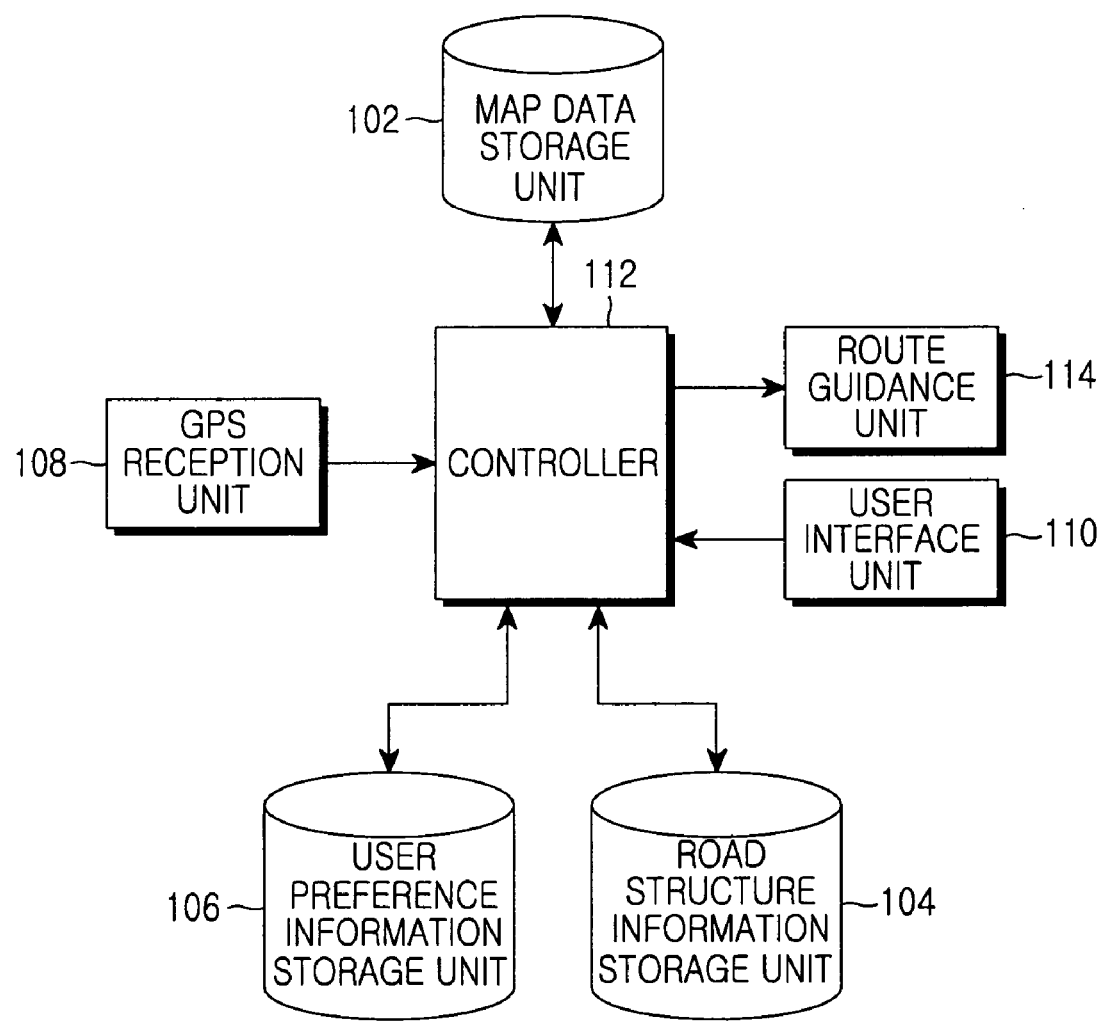
FIG. 1 is a block diagram illustrating a personal navigation terminal according to an embodiment of the present invention.

FIG. 1 is a block diagram illustrating a personal navigation terminal according to an embodiment of the present invention. Referring to FIG. 1, the PNS according to an embodiment of the present invention includes a map data storage unit 102, a road structure information storage unit 104, a user preference information storage unit 106, a Global Positioning System (GPS) reception unit 108, a user interface unit 110, a controller 112 and a route guidance unit 114.

The map data storage unit 102 stores map data for roads, sidewalks, stores, and structures in each area together with location information.

The road structure information storage unit 104 stores various information related to road structures contained in the map data. That is, the road structure information storage unit 104 stores road structure information for factors which may make a user tired when the user uses the road structures, or prevent the user from using the road structures due to certain obstacles.

FIG. 2 is a table illustrating one example of storing road structure information according to the embodiment of the present invention. Referring to FIG. 2, road structures may include crosswalks, uphill roads, downhill roads, viaducts, underpasses, railway crossing, tunnels, construction zones, alleys with no sidewalk, etc. The length represents a length of each road structure, which may be expressed by the unit "meter". The slope represents a slope of each road structure. The slope is expressed by values 1 to 5, level land being given a value of 1 and the steepest slope being given a value of 5. The height coefficient represents a height of each road structure. The height coefficient is expressed by values 1 to 5. For example, when a height difference is 0, the height coefficient may have a value of 1. When a height difference is a maximum, the height coefficient may have a value of 5. The depth coefficient represents a depth of each road structure. When it is assumed that the depth coefficient is expressed by values 1 to 5, a level land and the deepest case may have values of 1 and 5, respectively.

The information for each road structure as described above may also include other factors associated with user characteristics and body conditions in addition to the length, the slope, the height and the depth of each road structure.

The user preference information storage unit 106 stores user preference information representing the preference trend of a user for road structures or means of public transportation. The user preference information may include road structure preference or public transportation preference of a user.

FIG. 3 is a table illustrating one example of storing user preference information according to the embodiment of the present invention. Referring to FIG. 3, the user preference information storage unit 106 stores road structure preference or public transport preference according to users including the general public, the disabled, old persons and children in order to satisfy user characteristics and body conditions.

The road structure preference represents the degree of preference of a user for each road structure. In the embodiment of the present invention, the road structure preference is expressed by values 0 to 10. As a user prefers each road structure, the road structure preference has a higher value. However, as a user desires to avoid each road structure, the road structure preference has a lower value. For example, when a user A has preference of 2 for a crosswalk and preference of 10 for a downhill road, the user A prefers the downhill road over the crosswalk.

The public transportation preference represents the degree of preference of a user for all means of public transportation. In the embodiment of the present invention, the public transportation preference is expressed by values 1 to 5. As a user prefers all means of public transportation, the public transportation preference has a higher value. However, if a user desires to avoid all means of public transportation, the public transportation preference has a lower value. For example, when a user A has preference of 5 for bus and preference of 3 for subway, the user A prefers the bus over the subway.

The road structure preference and the public transportation preference according to each user as described above may be stored so that general preference of users has an average reference value in the course of manufacturing a personal navigation terminal. Further, the road structure preference and the public transport preference according to each user may have different values according to the status of a user (body health status, psychology status, etc.).

The GPS reception unit 108 receives GPS signals for location measurement of the personal navigation terminal from a GPS satellite. The user interface unit 110 may include an input device such as a keypad, a touch panel, etc., to interface with a user. For example, the user interface unit 110 receives either the road structure preference and the public transportation preference, or a route guidance request to a destination from a user.

The controller 112 controls storage of user preference information including the road structure preference and the public transportation preference input from a user. The controller 112 computes routes to a destination from the current location by means of map data based on the route guidance request from a user. The controller 112 can calculate the distance indices for each route to the destination from the current location by means of the stored road structure preference and public transportation preference. That is, the controller 112 computes the distance indices according to road structures included in each route up to the destination by means of the road structure preference and the public transportation preference, and calculates the total distance index for a corresponding route by adding the distance indices according to the road structures and a length of a general road.

For example, the distance indices according to the road structures may be expressed by Equation 1.

crosswalk distance index $A$=number of crosswalks*crosswalk length*1/crosswalk preference+crosswalk signal waiting index uphill road distance index $B$=number of uphill roads*uphill road length*slope*1/uphill road preference downhill road distance index $C$=number of downhill roads*downhill road length*slope*1/downhill road preference viaduct distance index $D$=number of viaducts*viaduct length*viaduct height coefficient*1/viaduct preference underpass distance index $E$=number of underpasses*underpass length*underpass depth coefficient*1/underpass preference railway crossing distance index $F$=number of railway crossings*railway crossing length*1/railway crossing preference tunnel distance index $G$=number of tunnels*tunnel length*1/tunnel preference construction zone distance index H=number of construction zones*construction zone length*1/construction zone preference distance index $I$ of an alley with no sidewalk=number of alleys with no sidewalk*length of alley with no sidewalk*1/preference of alley with no sidewalk (1)

Referring to Equation 1, the distance indices according to the road structures increase in proportion to the length, the slope, the height coefficient and the depth coefficient of a corresponding road structure while decreasing in inverse proportion to user preference for the corresponding road structure. Accordingly, the distance indices according to the road structures represents a distance obtained by taking into consideration both the fatigue of a user when the user passes through the corresponding road structure and the preference of the user for the corresponding road structure, rather than just a physical distance of the corresponding road structure.

After computing the distance indices according to the road structures as describing above, the controller 112 calculates the total distance index for the corresponding route by adding the distance indices according to the road structures and the length of the general road. An equation for calculating the total distance index may be expressed by Equation 2.

total distance index=length of general road+$A$+$B$+$C$+ $D$+$E$+$F$+$G$+$H$+$I$ (2)

Referring to Equation 2, the general road represents a remaining road excluding the road structures, and represents a road in which a slope, a height coefficient, a depth coefficient, etc., have values of 1, respectively. The A, B, C, D, E, F, G, H, and I represent the distance indices according to the road structures.

The controller 112 calculates the total distance index for each route as described above, determines a route having the smallest distance index in the total distance index as the shortest route, and generates route guidance data. The route guidance unit 114 displays routes by means of the route guidance data provided from the controller 112.

Hereinafter, an example of a route guidance method using the total distance index for each route according to the embodiment of the present invention will be described in detail. FIGS. 4A, 4B, 4C, 5A and 5B are diagrams illustrating the route guidance method using the total distance index for each route from a start point to a destination according to the embodiment of the present invention.

Figure 4A:
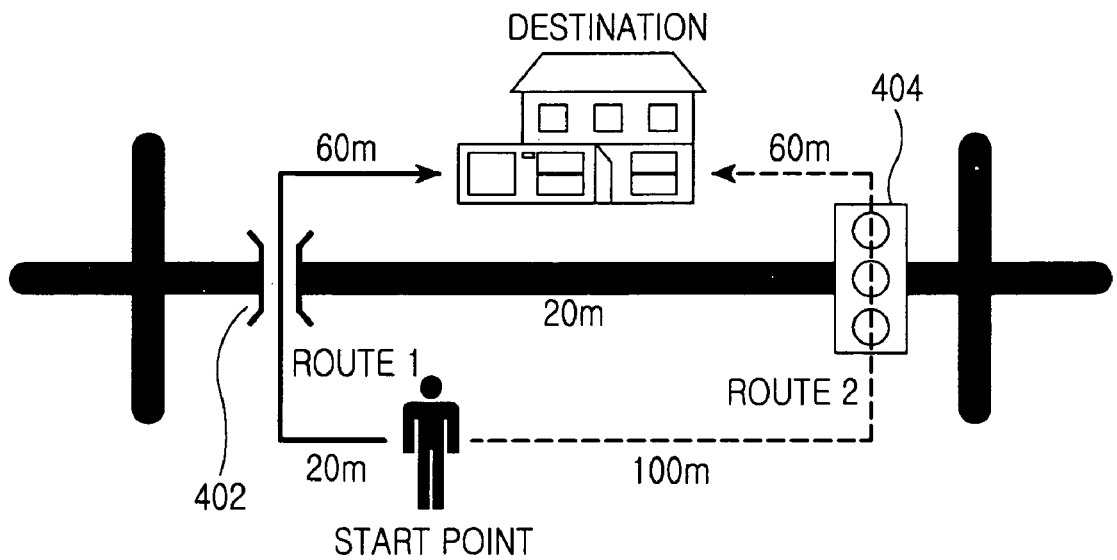
FIGS. 4A, 4B and 4C are diagrams illustrating a case in which one road structure exists in each route from a start point to a destination according to an embodiment of the present invention.
Figure 4B:
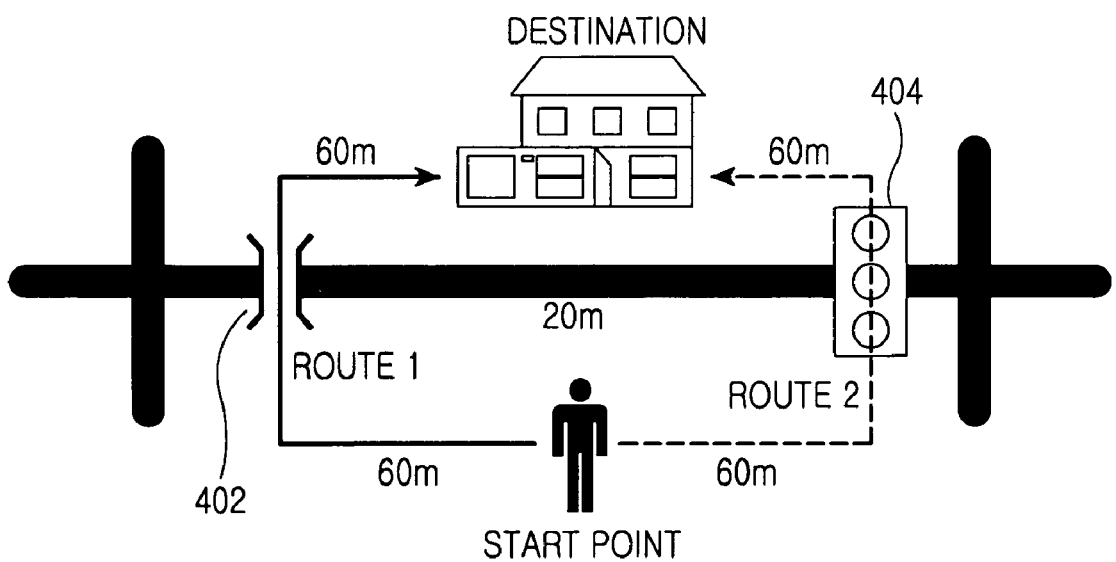
Figure 4C:
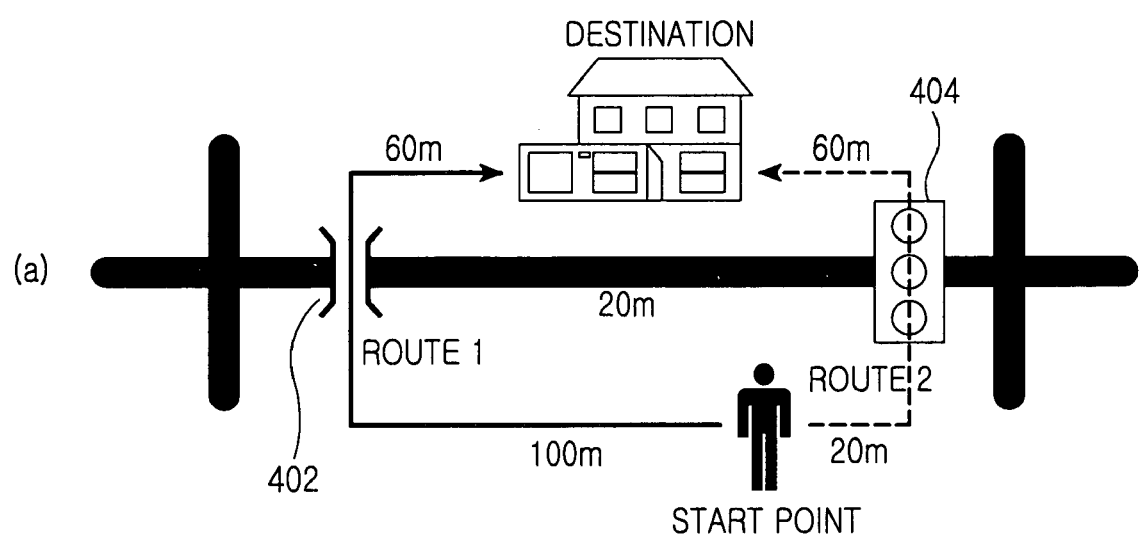

FIGS. 4A, 4B and 4C are diagrams illustrating a case in which one road structure exists in each route from a start point to a destination according to the embodiment of the present invention. FIGS. 4A, 4B and 4C show two routes "route 1" and "route 2" from the start point to the destination. The route 1 includes a viaduct 402 and the route 2 includes a crosswalk 404. It is assumed that structure information for the viaduct 402, i.e. the length and the height coefficient of the viaduct 402 are 20 m and 2, and structure information for the crosswalk 404, i.e. the length of the crosswalk 404 is 20 m. Further, it is assumed that 60 seconds are required until walk signals of the crosswalk 404 are turned on and an average walking speed is 2 m/s.

FIG. 4A shows a case in which the start point is adjacent to the viaduct 402. Referring to FIG. 4A, a general road in the route 1 has a length of 80 m (60 m+20 m) and a general road in the route 2 has a length of 160 m (100 m+60 m).

In the case of FIG. 4A, the prior art displays the route 1 which is the shorter route of the two routes, i.e. the route 1 and the route 2. However, the embodiment of the present invention calculates distance indices in consideration of both information for road structures according to the routes and the user preference for the road structures, and displays a route having a small distance index.

For example, when preference for viaducts is 0.2 and preference for crosswalks is 2 in FIG. 4A, the total distance indices of the route 1 and the route 2 may be calculated by Equations 3 and 4.

$$\begin{aligned}
\text{total distance index of the route 1} &= \text{length of general road} + \\
&\quad \text{distance index of viaduct} \\
&= \text{length of general road} + \\
&\quad \text{number of viaducts} * \\
&\quad \text{viaduct length} * \\
&\quad \text{viaduct height coefficient} * \\
&\quad 1/\text{viaduct preference} \\
&= 80 + 1*20*2*5 \\
&= 280
\end{aligned} \quad (3)$$

$$\begin{aligned}
\text{total distance index of the route 2} &= \text{length of general road} + \\
&\quad \text{distance index of crosswalk} \\
&= \text{length of general road} + \\
&\quad \text{number of crosswalks} * \\
&\quad \text{crosswalk length} * \\
&\quad 1/\text{crosswalk preference} * \\
&\quad \text{walker signal waiting index} \\
&= 160 + 1*20*0.5*(60*2 - 100) \\
&= 190
\end{aligned} \quad (4)$$

As described above, when the preference for viaducts is 0.2 and the preference for crosswalks is 2 even though the route 2 has a distance greater than that of the route 1, the route 2 has the distance index less than that of the route 1 because the user preference for crosswalks is far greater than the user preference for viaducts. Accordingly, the present invention displays the route 2.

In a case in which the user preference for crosswalks is greater than the user preference for viaducts, if the difference between the two preferences is less than a difference between distances of the route 1 and the route 2, or if the crosswalk signal waiting time is long, the route 1 may have the distance index less than that of the route 2.

For example, when the preference for viaducts is 0.5 and the preference for crosswalks is 2 in FIG. 4A, the total distance indices of the route 1 and the route 2 may be calculated by Equations 5 and 6.

$$\text{total distance index of the route } 1=80+1*20*2*2=160 \quad (5)$$

$$\text{total distance index of the route } 2=160+1*20*0.5* \\ (60*2-100)=190 \quad (6)$$

As described above, in a case in which the user preference for crosswalks is greater than the user preference for viaducts, if the difference between the two preferences is less than a difference between distances of the route 1 and the route 2, or if the crosswalk signal waiting time is long, the route 1 may have the distance index less than that of the route 2. Accordingly, the present invention displays the route 1.

FIG. 4B shows a case in which the start point is located at a middle point between the viaduct 402 and the crosswalk 404. Referring to FIG. 4B, a general road in the route 1 has the same length (120 m=60 m+60 m) as that of a general road in the route 2.

Because the prior art displays the shortest route without taking into consideration the user preference for road structures, it may display the two routes. However, the present invention calculates distance indices by taking into consideration both the information for road structures according to the routes and the user preference for the road structures, and displays a route having a lesser distance index.

For example, when preference for viaducts is 0.2 and preference for crosswalks is 2 in FIG. 4B, the total distance indices of the route 1 and the route 2 may be calculated by Equations 7 and 8.

$$\text{total distance index of the route} \\ 1=120+1*20*2*5=320 \quad (7)$$

$$\text{total distance index of the route } 2=120+1*20*0.5* \\ (60*2-60)=190 \quad (8)$$

In FIG. 4B, when the preference for viaducts is 0.2 and the preference for crosswalks is 2, the present invention displays the route 2 having the less total distance index.

Further, when the preference for viaducts is 0.5 and the preference for crosswalks is 2 in FIG. 4B, the total distance indices of the route 1 and the route 2 may be calculated by Equations 9 and 10.

$$\text{total distance index of the route} \\ 1=120+1*20*2*2=200 \quad (9)$$

$$\text{total distance index of the route } 2=120+1*20*0.5* \\ (60*2-60)=190 \quad (10)$$

In FIG. 4B, when the preference for viaducts is 0.5 and the preference for crosswalks is 2, the embodiment of the present invention displays the route 2 having the lesser total distance index.

Further, when the preference for viaducts is 1 and the preference for crosswalks is 2 in FIG. 4B, the total distance indices of the route 1 and the route 2 may be calculated by Equations 11 and 12.

$$\text{total distance index of the route} \\ 1=120+1*20*2*1=160 \quad (11)$$

$$\text{total distance index of the route } 2=120+1*20*0.5* \\ (60*2-60)=190 \quad (12)$$

In FIG. 4B, when the preference for viaducts is 1 and the preference for crosswalks is 2, the present invention displays the route 1 having the lesser total distance index.

According to the embodiment of the present invention, when the general road in the route 1 has the same length as that of the general road in the route 2, the route 1 and the route 2 have the different total distance indices according to the preference for viaducts or crosswalks, so that the route having the lesser total distance index is displayed.

FIG. 4C shows a case in which the start point is adjacent to the crosswalk 404. Referring to FIG. 4C, a general road in the route 1 has a length of 160 m (60 m+100 m) and a general road in the route 2 has a length of 80 m (60 m+20 m).

Because the prior art displays the shortest route without taking into consideration the user preference for road structures, it displays the route 2 which is the shorter route of the two routes. However, the present invention calculates distance indices by taking into consideration both the information for road structures according to the routes and the user preference for the road structures, and displays a route having a lesser distance index.

For example, when preference for viaducts is 0.2 and preference for crosswalks is 2 in FIG. 4C, the total distance indices of the route 1 and the route 2 may be calculated by Equations 13 and 14.

$$\text{total distance index of the route } 1=160+1*20*2*1/ \\ 0.2=360 \quad (13)$$

$$\text{total distance index of the route} \\ 2=80+1*20*0.5*(60*2-60)=190 \quad (14)$$

In FIG. 4C, when the preference for viaducts is 0.2 and the preference for crosswalks is 2, the present invention displays the route 2 having the lesser total distance index.

Further, when the preference for viaducts is 1 and the preference for crosswalks is 2 in FIG. 4C, the total distance indices of the route 1 and the route 2 may be calculated by Equations 15 and 16.

$$\text{total distance index of the route } 1 = 160 + 1*20*2*1/1 = 200 \quad (15)$$

$$\text{total distance index of the route } 2 = 80 + 1*20*0.5*(60*2-60) = 190 \quad (16)$$

In FIG. 4C, when the preference for viaducts is 1 and the preference for crosswalks is 2, the present invention displays the route 2 having the lesser total distance index.

Further, when the preference for viaducts is 2 and the preference for crosswalks is 2 in FIG. 4C, the total distance indices of the route 1 and the route 2 may be calculated by Equations 17 and 18.

$$\text{total distance index of the route } 1 = 160 + 1*20*2*1/2 = 180 \quad (17)$$

$$\text{total distance index of the route } 2 = 80 + 1*20*0.5*(60*2-60) = 190 \quad (18)$$

In FIG. 4C, when the preference for viaducts is 2 and the preference for crosswalks is 2, the present invention displays the route 1 having the lesser total distance index.

Consequently, the present invention displays a route based on the total distance index obtained by reflecting the user location, the road structure information, the user preference for the road structures, etc., instead of simply displaying a route from the start point to the destination with the shortest route.

Figure 5A:
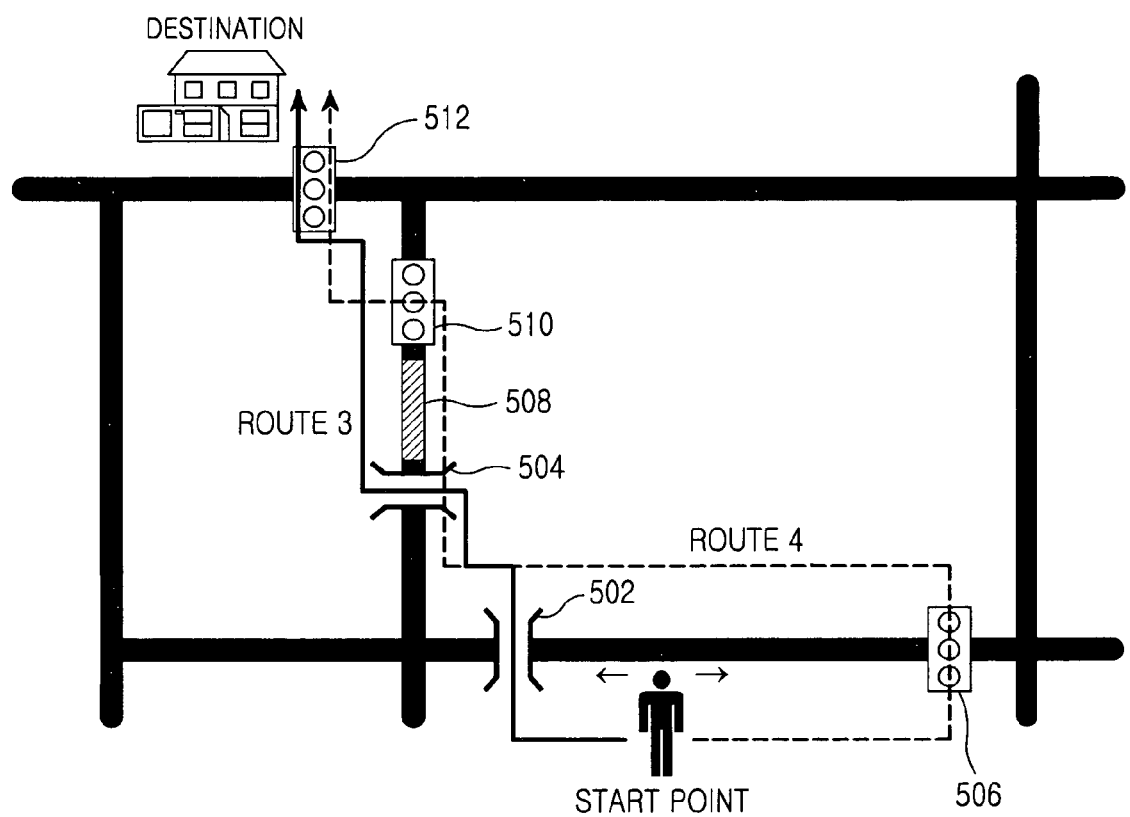
FIGS. 5A and 5B are diagrams illustrating a case in which at least one road structure exist in each route from a start point to a destination according to an embodiment of the present invention.
Figure 5B:
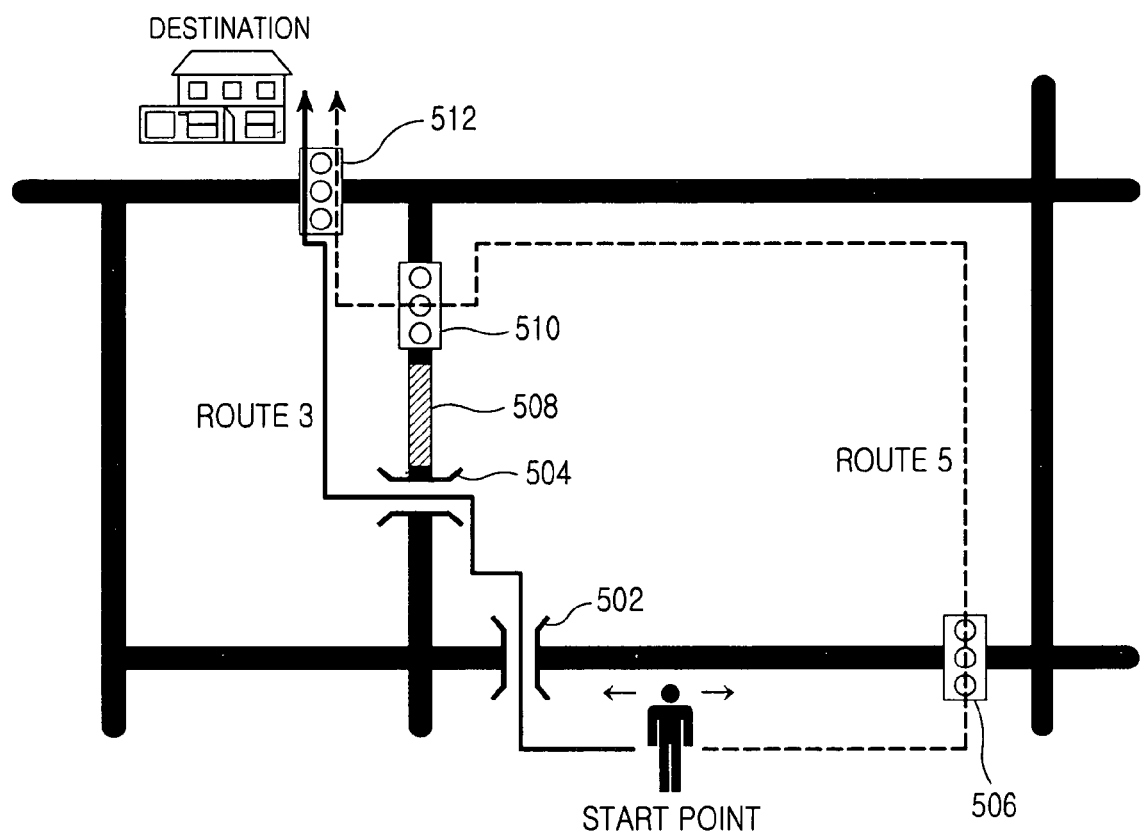

FIGS. 5A and 5B are diagrams illustrating a case in which at least one road structure exists in each route from a start point to a destination according to the embodiment of the present invention. FIGS. 5A and 5B show a case in which a crosswalk, a viaduct and an uphill road exist in routes from the start point to the destination. In FIGS. 5A and 5B, a "route 3" corresponds to the shortest route without taking into consideration both the information for the road structures and the user preference for the road structures, and includes a first viaduct 502, a second viaduct 504, a third crosswalk 512.

If a user wants to receive guidance for a short route, the "route 3" as described above is displayed. However, when a user is for example an old person, the disabled or feels fatigue, the user may want to receive guidance for a convenient road with no road structures (e.g. viaducts, uphill roads, etc), which the user has trouble in using or dislikes using, rather than the guidance for the short route. Accordingly, the user inputs low preference for the road structures, which the user has trouble in using or dislikes using from among road structures, to the route guidance device in the personal navigation terminal. Then, the route guidance device in the personal navigation terminal displays a route avoiding road structures of low preference based on the user preference for road structures.

For example, when a user inputs low preference for viaducts among various road structures, the route guidance device in the personal navigation terminal displays a route "route 4" as illustrated in FIG. 5A, which avoids the viaduct among routes along which the user can arrive at a destination. The "route 4" corresponds to the route avoiding the viaduct from a start point to a destination, and passes through a first crosswalk 506, an uphill road 508, a second crosswalk 510 and a third crosswalk 512.

Further, when a user inputs low preference for uphill roads among various road structures, the route guidance device in the personal navigation terminal displays a route "route 4" as illustrated in FIG. 5B, which avoids the uphill road 508 among routes along which the user can arrive at a destination. The "route 5" corresponds to the route avoiding the uphill road from a start point to a destination, and passes through the first crosswalk 506, the second crosswalk 510 and the third crosswalk 512.

As described above, the route guidance device in the personal navigation terminal according to the present invention displays an optimal route based on user preference for various road structures including crosswalks, uphill roads, downhill roads, viaducts, underpasses, railway crossings, tunnels, construction zones, alleys with no sidewalk, etc.

Figure 6:
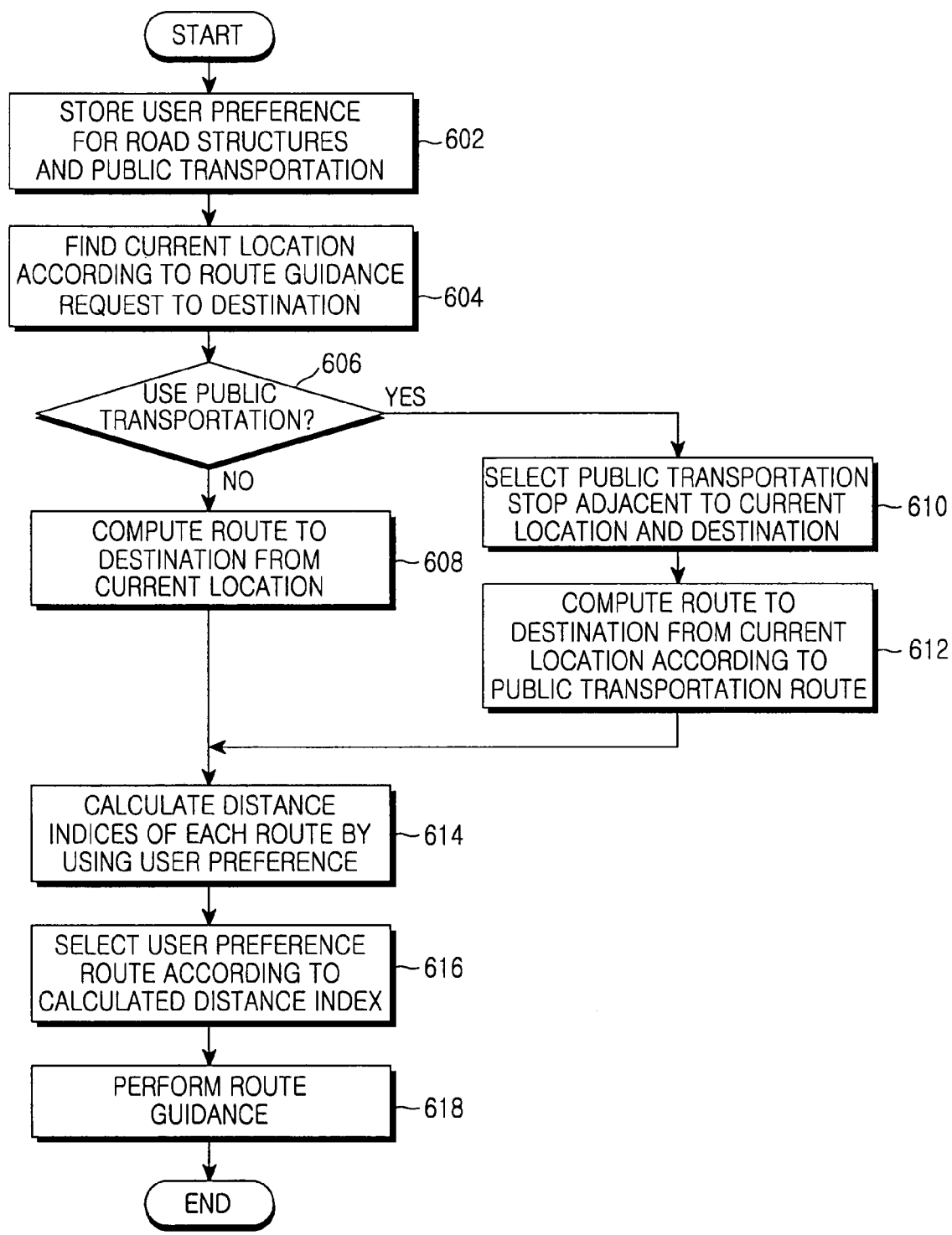
FIG. 6 is a flow diagram illustrating a route guidance method considering the user preference according to a first embodiment of the present invention.

Hereinafter, a route guidance process by the personal navigation terminal as described above will be described in detail. FIG. 6 is a flow diagram illustrating a route guidance method reflecting the user preference according to a first embodiment of the present invention.

Referring to FIG. 6, the personal navigation terminal stores user preferences for road structures and public transportation in step 602. For example, the personal navigation terminal stores road structure preferences and public transportation preferences according to each user, for example the general public, the disabled, old persons and children, etc. The road structure preferences and the public transportation preferences according to each user may be stored so that the preferences of users has an average reference value in the course of manufacturing a personal navigation terminal. Further, the road structure preferences and the public transportation preferences according to each user may have different values according to the status of users (body health status, psychology status, etc.).

After storing the user preferences as described above, the personal navigation terminal finds the current user location according to a route guidance request to a destination in step 604. For example, a user inputs destination route guidance request signals through the user interface unit 110, the personal navigation terminal finds the current user location by means of GPS signals received through the GPS reception unit 108.

In step 606, the personal navigation terminal determines whether to display a route using the public transportation or a route excluding the public transportation according to the user selection.

If a user selects a route guidance excluding the public transport, the personal navigation terminal computes routes to a destination from the current location in step 608. Herein, the personal navigation terminal computes all routes along which the user may arrive at the destination from the current location without using the public transportation.

However, if the user selects a route guidance using the public transportation, the personal navigation terminal searches for public transportation stops adjacent to the current location and the destination from the map data storage unit 102 in step 610. In step 612, the personal navigation terminal computes routes along which the user may arrive at the destination from the current location according to public transportation routes. Herein, the personal navigation terminal determines the means of public transportation based on the public transportation preference stored in the user preference information storage unit 106, and computes a public transportation route along which the user may arrive at the destination by using the determined means of public transportation. Further, the personal navigation terminal computes all routes along which the user may arrive at the destination from the current location according to public transportation routes.

When the computation for the routes to the destination from the current location is completed as described above, the personal navigation terminal calculates distance indices of each route by using the previously stored user preferences in step 614. That is, the personal navigation terminal computes distance indices according to road structures included in each route to the destination, and sums up the distance indices according to the road structures and general road lengths, thereby calculating the total distance index for a corresponding route.

In step 616, the personal navigation terminal selects a user-preferred route from among the routes to the destination from the current location according to the calculated distance index. Herein, the personal navigation terminal selects a route having the smallest distance index in the total distance indices calculated for each route as the user-preferred route. In step 618, the personal navigation terminal performs route guidance for the user-preferred route.

As a result, the route guidance method according to the present invention displays a user-preferred route reflecting user preference for both road structures and public transportation, instead of simply displaying the shortest route from among the routes to the destination from the current location.

However, the route guidance method according to the present invention as described above cannot confirm routes when a user uses the public transportation and when the user does not use the public transportation. Accordingly, in a second embodiment of the present invention, a user can select whether to receive route guidance using the public transport or route guidance excluding the public transportation after route computation.

Figure 7:
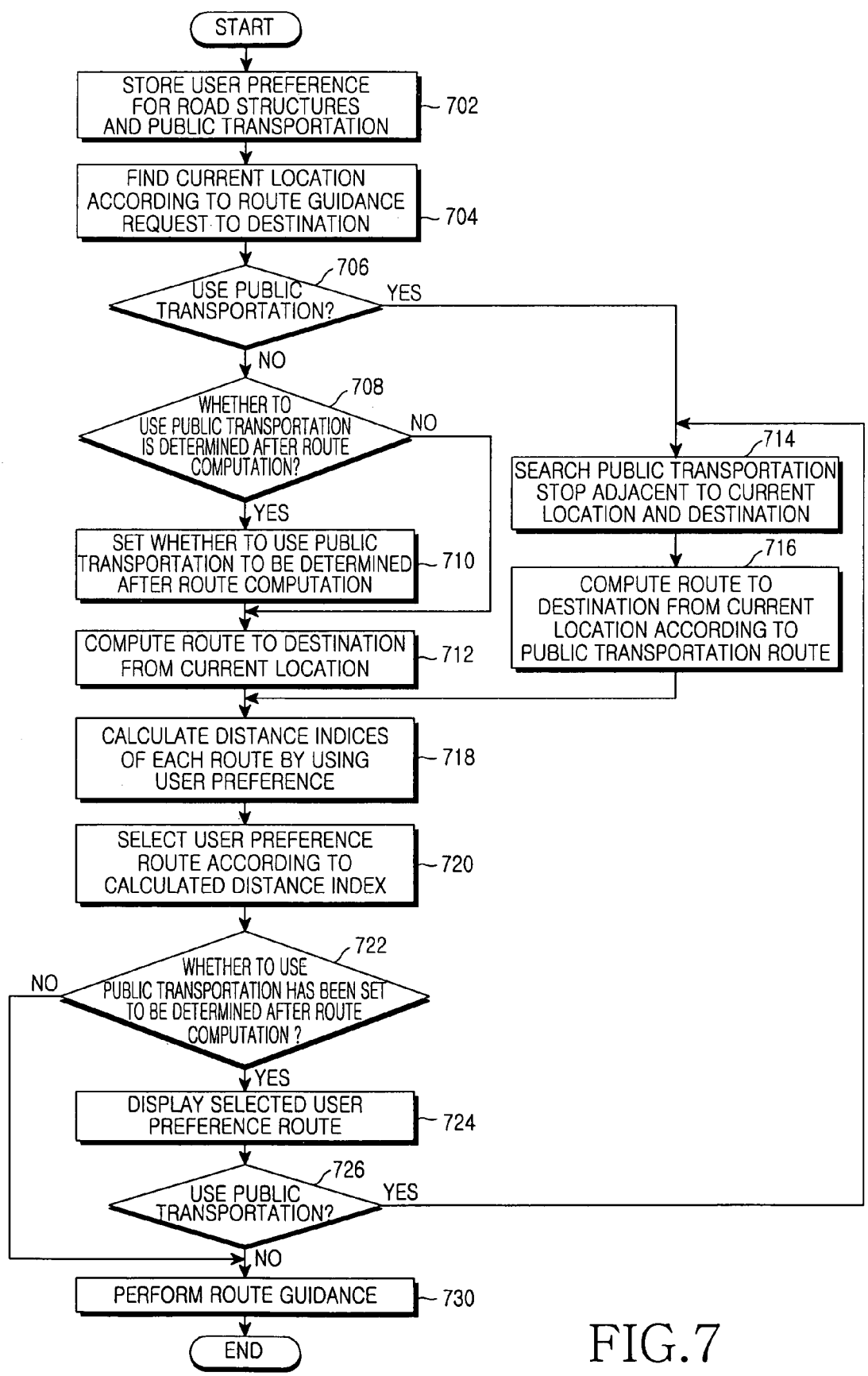
FIG. 7 is a flow diagram illustrating a route guidance method considering the user preference according to a second embodiment of the present invention.

FIG. 7 is a flow diagram illustrating a route guidance method that takes into consideration user preferences according to a second embodiment of the present invention. Referring to FIG. 7, the personal navigation terminal stores the user preference for road structures and public transportation in step 702. Then, the personal navigation terminal finds the current user location according to a route guidance request to a destination in step 704. In step 706, the personal navigation terminal determines whether to display a route using the public transportation or a route excluding the public transportation according to user selection.

If a user selects route guidance excluding the public transportation, the personal navigation terminal determines whether or not it is set to determine public transportation after a route computation in step 708. If the user selects to determine the public transportation after the route computation, the personal navigation terminal is set such that whether to use the public transportation is determined after the route computation in step 710. Then, step 712 is performed. However, if it is not determined to use the public transportation after the route computation, step 712 is directly performed.

In step 712, the personal navigation terminal computes routes to a destination from the current location. Herein, the personal navigation terminal computes all routes along which the user may arrive at the destination from the current location without using the public transportation.

In the meantime, if the user selects route guidance using the public transportation, the personal navigation terminal searches for public transportation stops adjacent to the current location and the destination from the map data storage unit 102 in step 714. In step 716, the personal navigation terminal computes all routes along which the user may arrive at the destination from the current location by means of public transportation routes.

If the computation for the routes to the destination from the current location is completed as described above, the personal navigation terminal calculates distance indices of each route by using the previously stored user preference in step 718. That is, the personal navigation terminal computes distance indices according to road structures included in each route to the destination, and sums up the distance indices according to the road structures and general road lengths, thereby calculating the total distance index for a corresponding route.

In step 720, the personal navigation terminal selects a user-preferred route from among the routes to the destination from the current location according to the calculated distance index. Herein, the personal navigation terminal selects a route having the smallest distance index in the total distance indices calculated for each route as the user-preferred route.

After selecting the user-preferred route as described above, the personal navigation terminal determines if it has been set such that whether to use the public transportation is determined after the route computation in step 722.

If it has not been set such that whether to use the public transportation is determined after the route computation, the personal navigation terminal displays the user-preferred route in step 730. However, if it has been set such that whether to use the public transportation is determined after the route computation, the personal navigation terminal displays the user-preferred route in step 724. This option can be used to check the calculated user-preferred route and to determine whether to use the public transportation.

After displaying the user-preferred route, the personal navigation terminal determines again if a guidance request for a route using the public transportation or a route excluding the public transportation is received from the user in step 726. If the guidance request for the route using the public transportation is received from the user, the procedure returns to step 714. However, if the guidance request for the route using the public transportation is not received from the user, the personal navigation terminal performs displays the user-preferred route in step 730.

As a result, the second embodiment of the present invention as described above computes and displays the user-preferred route reflecting the user preference from among the routes to the destination from the current location. In addition, the route guidance method according to the second embodiment of the present invention allows the user to check the calculated user-preferred route and to determine whether to use the public transportation.

The embodiments of the present invention as described above compute the user-preferred route to the destination from the current location only once and performs the route guidance based on the computed user-preferred route. However, according to the third embodiment of the present invention, it is also possible to compute the user-preferred route in realtime and display the computed user-preferred route as the user moves.

Figure 8:
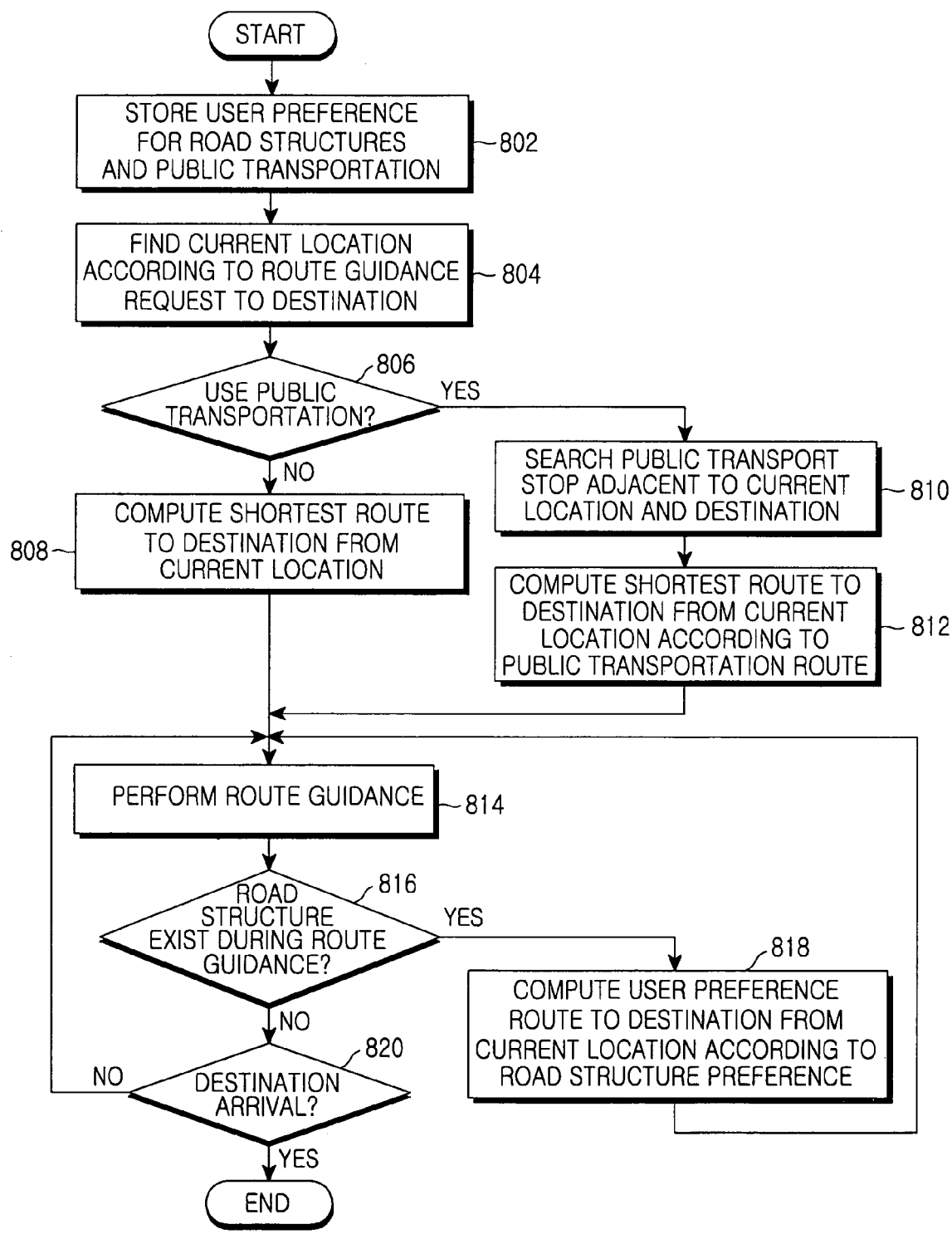
FIG. 8 is a flow diagram illustrating a route guidance method considering the user preference according to a third embodiment of the present invention.

FIG. 8 is a flow diagram illustrating a route guidance method by considering user preferences according to a third embodiment of the present invention. Referring to FIG. 8, the personal navigation terminal stores the user preference for road structures and public transportation in step 802. Then, the personal navigation terminal finds the current user location according to a route guidance request to a destination in step 804. In step 806, the personal navigation terminal whether to display a route using the public transportation or a route excluding the public transportation according to user selection.

If a user selects route guidance excluding the public transportation, the personal navigation terminal computes the shortest route to the destination from the current location in step 808. Herein, the personal navigation terminal computes the shortest route along which the user may arrive at the destination from the current location without using the public transportation.

However, if the user selects route guidance using the public transportation, the personal navigation terminal searches for public transportation stops adjacent to the current location and the destination in step 810. In step 812, the personal navigation terminal computes the shortest route from among routes along which the user may arrive at the destination from the current location by means of public transportation routes. Herein, the personal navigation terminal determines means of public transportation based on the public transportation preferences stored in the user preference information storage unit 106, and computes a public transportation route along which the user may arrive at the destination by using the determined means of public transportation. Further, the personal navigation terminal computes the shortest route from among all routes along which the user may arrive at the destination from the current location according to public transportation routes.

When the computation for the shortest route is completed as described above, the personal navigation terminal performs route guidance according to the computed route in step 814. In step 816, the personal navigation terminal determines if road structures exist while performing the route guidance. If the road structures exist while performing the route guidance, the personal navigation terminal computes a user-preferred route to the destination from the current location according to the road structure preferences in step 818. That is, the personal navigation terminal computes the user-preferred route to the destination by means of the user preferences for the road structures existing in the current location with reference to the previously stored preferences for corresponding road structures. Then, the personal navigation terminal displays the user-preferred route in step 814.

However, if the road structures do not exist while performing the route guidance, the personal navigation terminal continues to perform the route guidance and determines if the user has arrived at the destination in step 820. If the user has not arrived at the destination, steps 814, 816, 818 and 820 are repeated. However, if the user has arrived at the destination, the personal navigation terminal ends the route guidance.

According to the third embodiment of the present invention as described above, when road structures exist while the personal navigation terminal performs the route guidance to the destination from the current location, the personal navigation terminal reflects the user preferences for the road structures, computes the user-preferred route in realtime and displays the computed user-preferred route.

According to the present invention as described above, a personal navigation terminal displays routes based on user preferences reflecting user characteristics instead of simply displaying the shortest route, thereby causing a user to take a proper route according to one's own characteristics and degree of fatigue.

Further, according to the present invention, a personal navigation terminal displays routes by means of road structures preferred by a user, thereby causing the user to take a route including road structures desired by a user. Accordingly, the disabled can receive route guidance including road structures which are easy to use instead of road structures which are difficult to use (e.g. a underpass, a viaduct, an uphill road, etc.).

Furthermore, the present invention provides a personal navigation associated with the public transportation and simultaneously displays routes by means of means of public transportation preferred by a user, thereby causing the user to receive route guidance including the means of public transportation desired by a user.

Moreover, according to the present invention, a personal navigation terminal displays routes characterized according to each user, so that personal navigation terminal can function as a device capable of conforming to user individuality.

Although a preferred embodiment of the present invention has been described for illustrative purposes, those skilled in the art will appreciate that various modifications, additions and substitutions are possible, without departing from the scope and spirit of the invention as disclosed in the accompanying claims, including the full scope of equivalents thereof.

What is claimed is:

1. A route guidance apparatus of a personal navigation terminal, the route guidance apparatus comprising:
   a road structure information storage unit for storing information related to road structures, the road structures including at least two of crosswalks, uphill roads, downhill roads, viaducts, underpasses, railway crossings, tunnels, construction zones, and alleys with no sidewalks;
   a user preference information storage unit for storing at least one road structure preference representing a preference of a user related to the at least one road structure; and
   a controller for determining a current location of the personal navigation terminal, computing routes to a destination from the current location, and selecting a user-preferred route from among the routes based on the at least one road structure preference.

2. The route guidance apparatus as claimed in claim 1, further comprising a route guidance unit for displaying the user-preferred route.

3. The route guidance apparatus as claimed in claim 1, further comprising a Global Positioning System (GPS) for determining the current location of the personal navigation terminal.

4. The route guidance apparatus as claimed in claim 1, wherein the user preference information storage unit stores the at least one road structure preference according to user characteristics and body conditions.

5. The route guidance apparatus as claimed in claim 1, wherein the controller computes routes using public transportation to the destination from the current location and routes excluding public transportation to the destination from the current location.

6. The route guidance apparatus as claimed in claim 5, wherein the user preference information storage unit further stores at least one public transportation preference representing a preference of a user for different means of public transportation.

7. The route guidance apparatus as claimed in claim 6, wherein the controller selects means of public transportation having a high public transportation preference, and computes the routes using public transportation to the destination from the current location.

8. The route guidance apparatus as claimed in claim 1, wherein the controller computes distance indices according to road structures included in each route to the destination with reference to the at least one road structure preference, adds the distance indices according to the road structures and general road lengths, calculates total distance indices for each route, and selects a route having a smallest total distance index as the user-preferred route.

9. The route guidance apparatus as claimed in claim 8, wherein the information for the road structures includes information for lengths, slopes, heights and depths of the road structures.

10. The route guidance apparatus as claimed in claim 8, wherein distance indices according to the road structures increase in proportion to lengths, slopes, heights and depths of the road structures while decreasing in inverse proportion to user preference for the road structures.

11. A route guidance method of a personal navigation terminal, the route guidance method comprising the steps of:
   storing at least one road structure preference representing a preference of a user for at least one road structure, the road structures including at least two of crosswalks, uphill roads, downhill roads, viaducts, underpasses, railway crossings, tunnels, construction zones, and alleys with no sidewalks;
   determining a current location;
   computing routes to a destination from the current location; and
   selecting a user-preferred route from among the routes based on the at least one road structure preference.

12. The route guidance method as claimed in claim 11, further comprising a step of displaying the user-preferred route.

13. The route guidance method as claimed in claim 11, wherein the step of computing the routes to the destination from the current location comprises the sub-steps of:
   determining if a user takes public transportation;
   computing routes using the public transportation to the destination from the current location when the user takes the public transportation; and
   computing routes excluding the public transportation to the destination from the current location when the user does not take the public transportation.

14. The route guidance method as claimed in claim 11, wherein the step of selecting the user-preferred route comprises the sub-steps of:
   computing distance indices according to the road structures included in each route to the destination with reference to the at least one road structure preference;
   adding the distance indices according to the road structures and general road lengths, and calculating total distance indices for each route; and
   selecting a route having a smallest total distance index as the user-preferred route.

15. The route guidance method as claimed in claim 14, wherein the information for the road structures includes information for lengths, slopes, heights and depths of the road structures.

16. The route guidance method as claimed in claim 15, wherein distance indices according to the road structures increase in proportion to lengths, slopes, heights and depths of the road structures while decreasing in inverse proportion to user preference for the road structures.

17. A route guidance method of a personal navigation terminal, the route guidance method comprising the steps of:
   storing at least one user preference for road structures and public transportation;
   determining a current location of the personal navigation terminal;
   when a public transportation preference is received from the user, determining to use the public transportation;
   computing routes using the public transportation and routes excluding the public transportation to the destination from the current location;
   selecting a user-preferred route from among the computed routes with reference to the at least one user preference;
   displaying the user-preferred route and receiving a selection whether to use the public transportation from the user after the selected user-preference route; and
   displaying an undated user-preferred route according to the selection regarding whether to use the public transportation.

18. The route guidance method as claimed in claim 17, wherein the step of computing the routes using the public transportation comprises the sub-steps of:
   searching for public transportation stops adjacent to the current location and the destination;
   determining means of public transportation based on preference of the user for the public transportation;
   selecting a public transport stop according to means of public transportation preferred by the user, and computing public transportation routes; and
   computing the routes using the public transportation to the destination from the current location by means of the public transportation routes.

19. The route guidance method as claimed in claim 18, wherein the means of public transportation includes at least one of a subway, a bus and a taxi.

20. The route guidance method as claimed in claim 17, wherein the road structures include at least one of crosswalks, uphill roads, downhill roads, viaducts, underpasses, railway crossing, tunnels, construction zones, and alleys with no sidewalk.

21. The route guidance method as claimed in claim 17, wherein the information for the road structures includes information for lengths, slopes, heights and depths of the road structures.

22. A route guidance method of a personal navigation terminal, the route guidance method comprising the steps of:
   storing at least one user preference for road structures and a public transportation;
   determining a current location of the personal navigation terminal;
   computing and displaying a shortest route to a destination from the current location based on the road structures and the public transportation;
   when the road structures are received from the user after computing the shortest route, computing a user-preferred route based on the received road structures; and
   displaying the computed user-preferred route.

23. The route guidance method as claimed in claim 22, wherein the step of computing and displaying the shortest route to the destination from the current location comprises the sub-steps of:
   determining if the user takes the public transportation;
   computing a shortest route using the public transportation to the destination from the current location when the user takes the public transportation;
   computing a shortest route excluding the public transportation to the destination from the current location when the user does not take the public transportation; and
   displaying the computed shortest routes.

* * * * *

UNITED STATES PATENT AND TRADEMARK OFFICE
CERTIFICATE OF CORRECTION

PATENT NO. : 7,617,044 B2  Page 1 of 1
APPLICATION NO. : 11/312144
DATED : November 10, 2009
INVENTOR(S) : Jae-Myeon Lee It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 578 days.

Signed and Sealed this

Nineteenth Day of October, 2010

David J. Kappos
*Director of the United States Patent and Trademark Office*